Feb. 10, 1925.  
C. P. LEE  
1,525,870  
AUTOMATIC FRUIT ELEVATOR  
Filed Oct. 9, 1923  
6 Sheets-Sheet 5

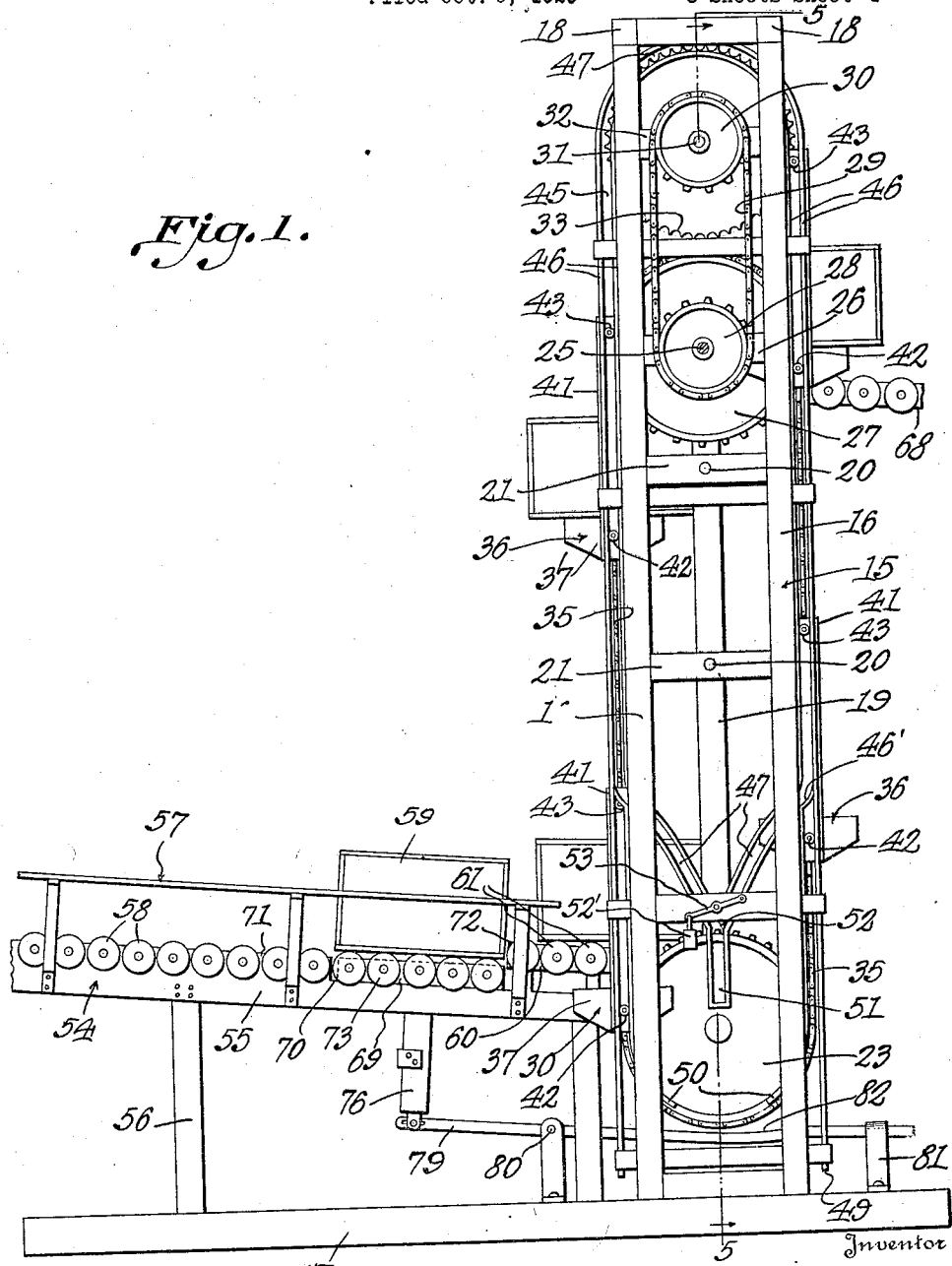

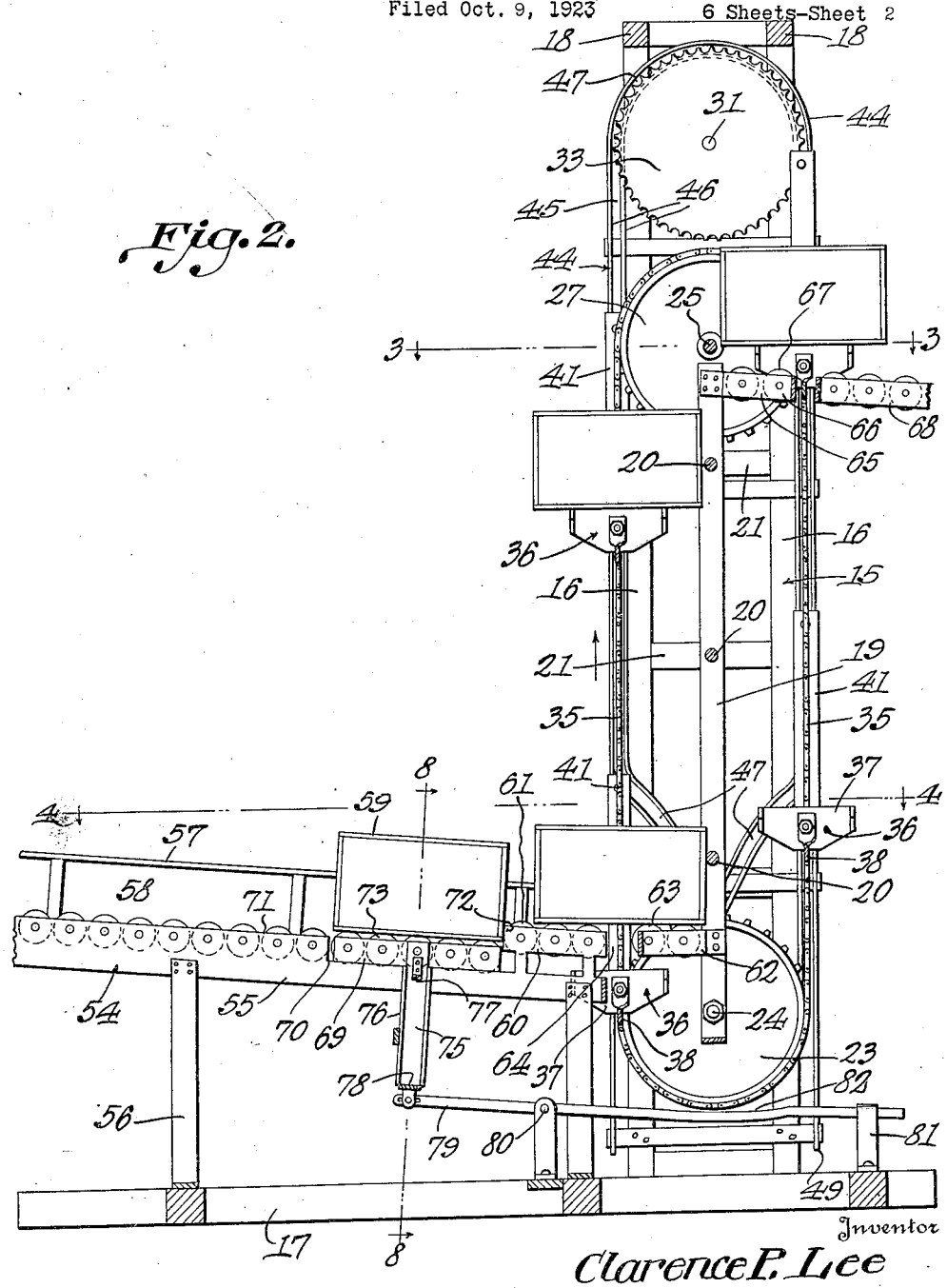

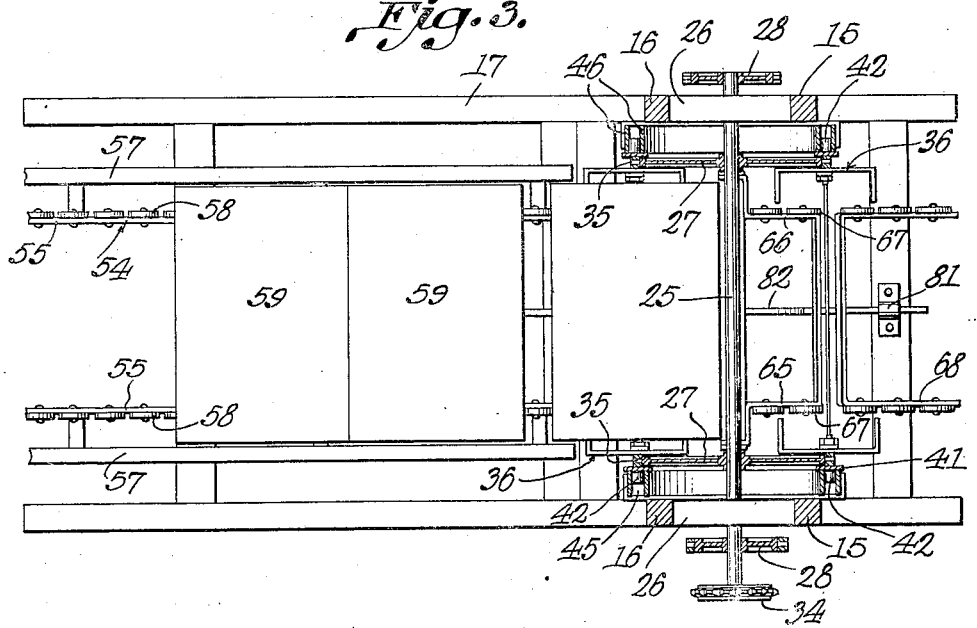
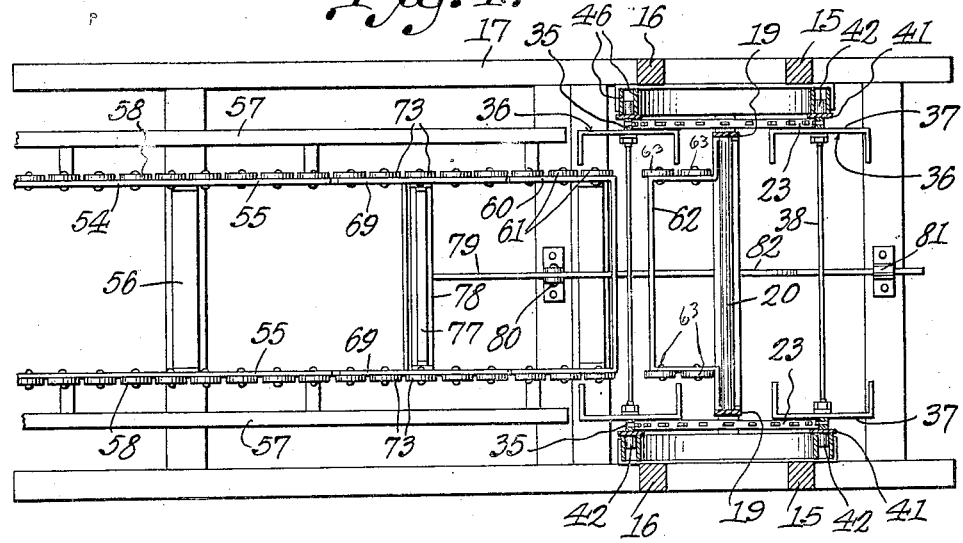

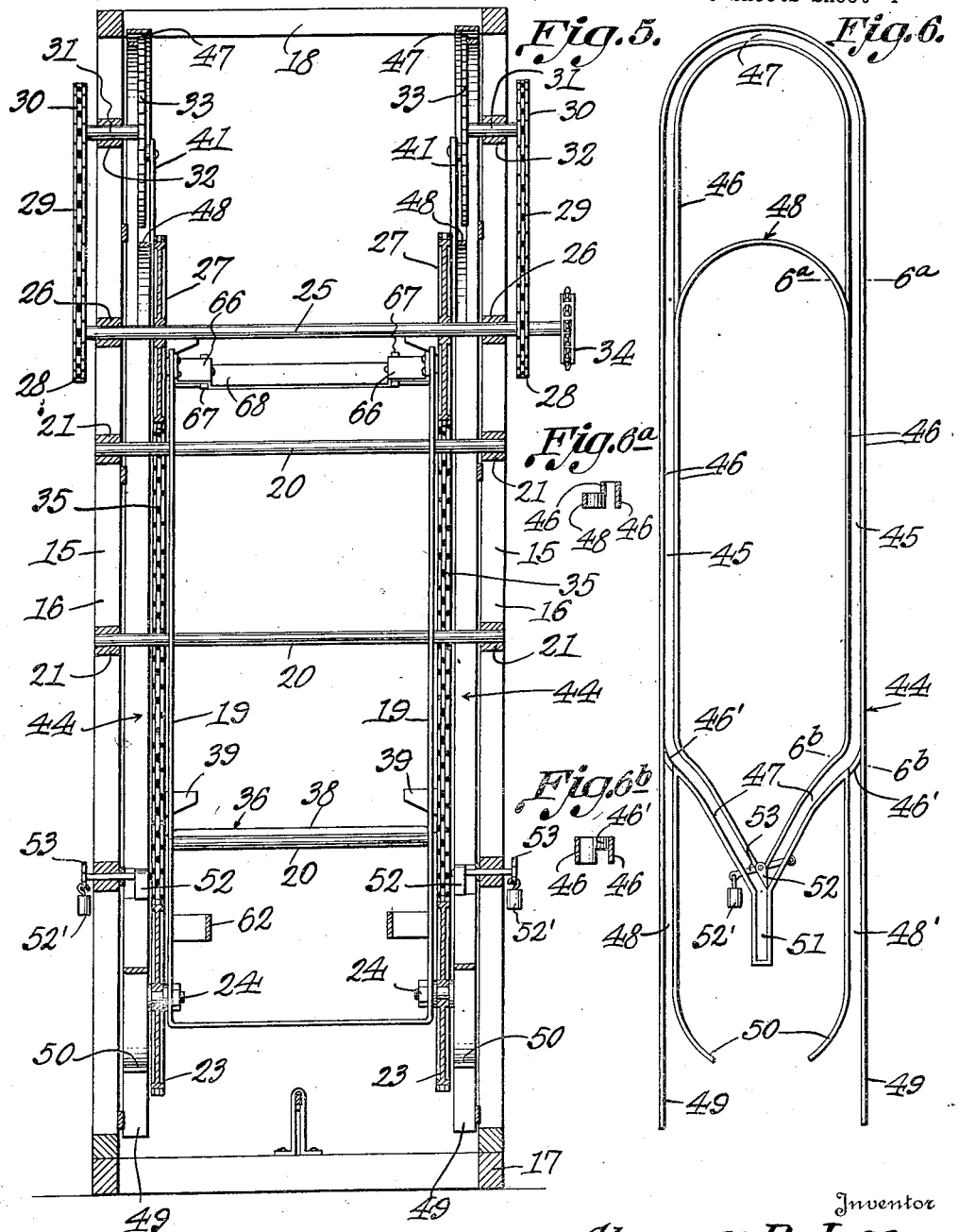

Inventor  
Clarence P. Lee  
By B. M. Hibben  
Attorney

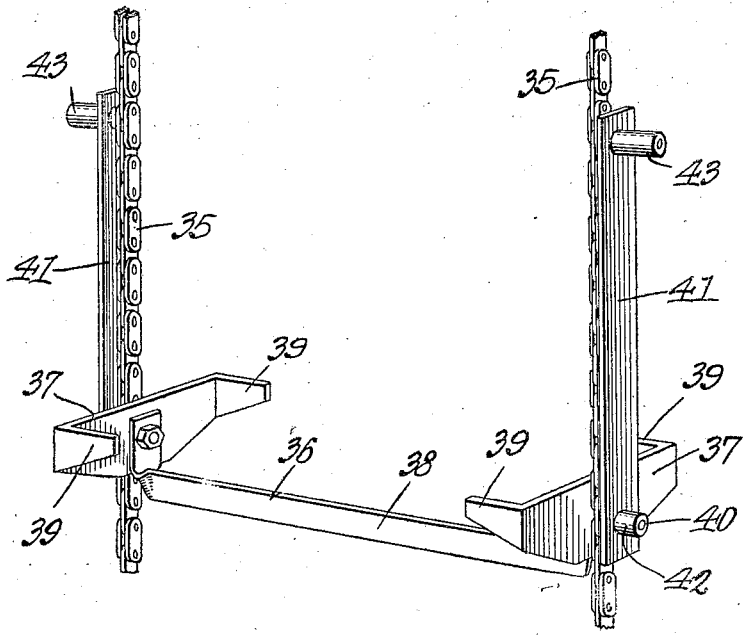
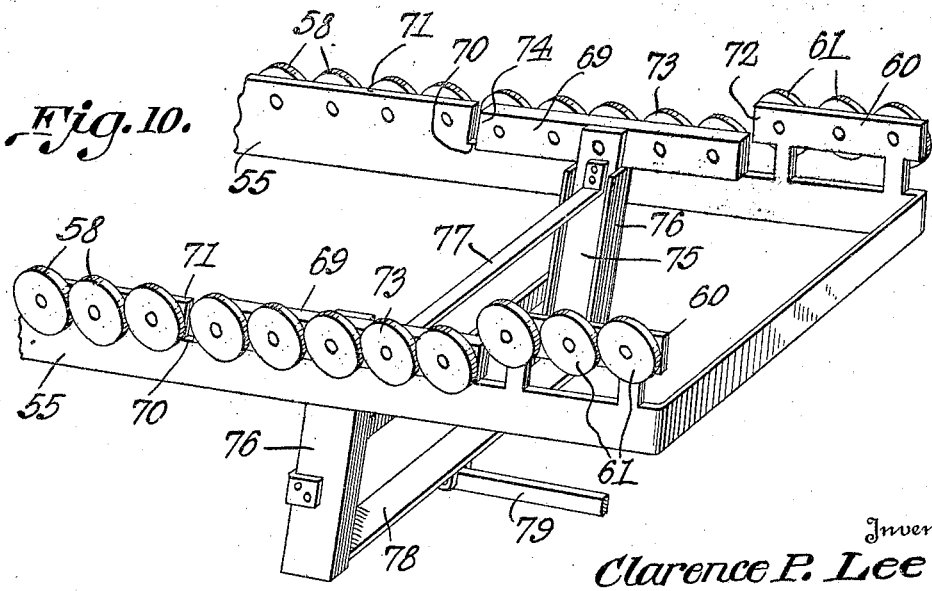

Patented Feb. 10, 1925.

1,525,870

UNITED STATES PATENT OFFICE.

CLARENCE P. LEE, OF WENATCHEE, WASHINGTON.

AUTOMATIC FRUIT ELEVATOR.

Application filed October 9, 1923. Serial No. 667,536.

*To all whom it may concern:*

Be it known that I, CLARENCE P. LEE, a citizen of the United States, residing at Wenatchee, in the county of Chelan and State of Washington, have invented certain new and useful Improvements in Automatic Fruit Elevators, of which the following is a specification.

My invention relates to improvements in elevators, well adapted for use in handling boxes or crates of fruit or the like, while not necessarily restricted to this use.

An important object of the invention is to provide simplified means for feeding the advance box or crate to a position for engagement with the lifting tray of the elevator, while checking the feeding movement of the succeeding boxes.

A further object of the invention is to provide means for retaining the lifting elements or trays substantially horizontal during their travel, in the load engaging position.

A further object of the invention is to provide apparatus of the above mentioned character, which is automatic and reliable in operation, strong and durable.

Other objects and advantages of the invention will be apparent during the course of the following description.

In the accompanying drawings, forming a part of this specification, and in which like numerals are employed to designate like parts throughout the same.

Figure 7:
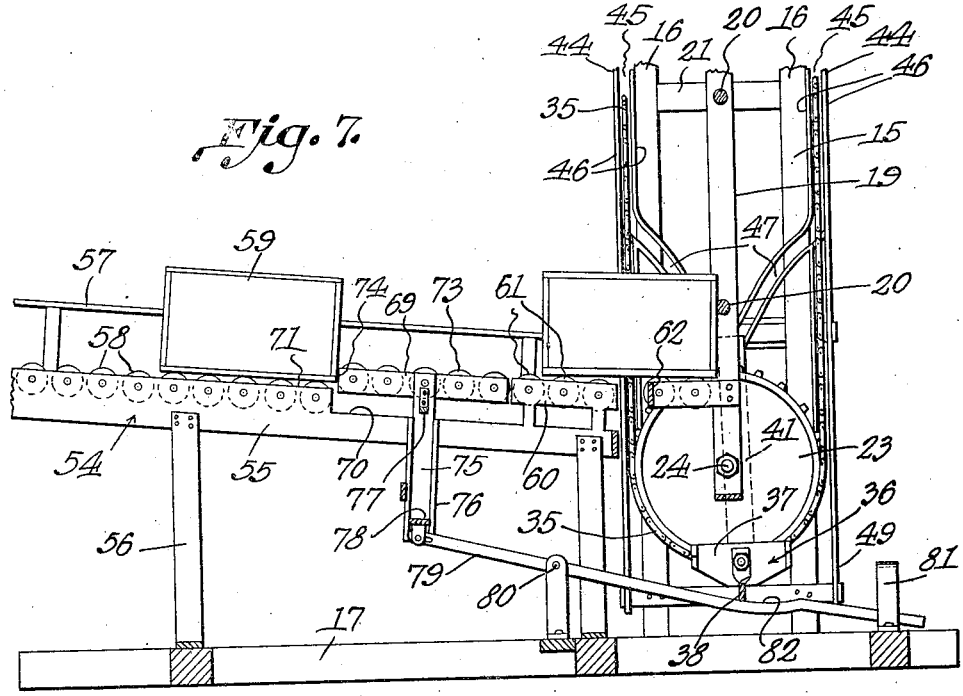
Figure 8:
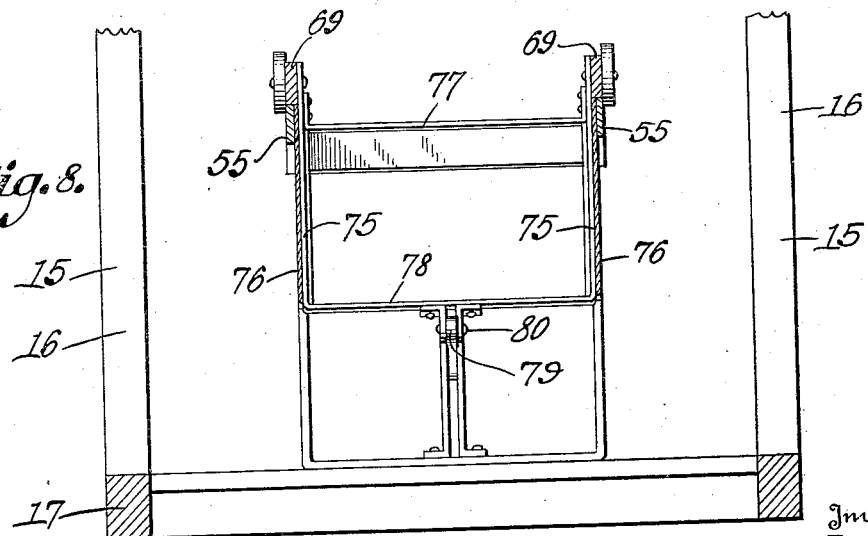

Figure 1 is a side elevation of a lifting apparatus embodying my invention,

Figure 2 is a central vertical longitudinal sectional view through the same, parts in elevation, Figure 3 is a horizontal section taken on line 3—3 of Figure 2, Figure 4 is a similar view taken on line 4—4 of Figure 2, Figure 5 is a longitudinal section taken on line 5—5 of Figure 1, Figure 6 is a side elevation of one of the guide tracks, Figure 6ª is a detail section taken on line 6ª—6ª of Figure 6, and, Figure 6ᵇ is a similar view taken on line 6ᵇ—6ᵇ of Figure 6, Figure 7 is a central vertical longitudinal section, similar to Figure 2, showing the trip lever depressed, Figure 8 is a transverse section taken on line 8—8 of Figure 2, Figure 9 is a perspective view of one of the lifting elements or carriers, Figure 10 is a similar view of the reciprocating feeding conveyor section.

In the drawings, wherein for the purpose of illustration is shown a preferred embodiment of my invention, the numeral 15 designates the vertical frame of a straight lift elevator, embodying longitudinal beams 16, which may be mounted upon a suitable base 17. These longitudinal beams may be connected at their upper ends by transverse beams 18. The invention is of course in no sense restricted to the specific type of elevator frame shown.

Arranged within the outer frame 15 is an inner U-shaped frame 19, secured to transverse shafts 20, which are anchored within transverse bars 21, rigidly mounted upon the longitudinal beams 16. The inner frame 19 is spaced from the sides of the outer frame, and sprocket wheels 23 are arranged between the lower end of the inner frame 19 and the sides of the outer frame 15, as clearly shown in Figure 5. These sprocket wheels are carried by stub shafts 24, rigidly attached to the inner frame 19. The upper ends of the inner frame 19 terminate beneath an upper drive shaft 25, journaled within transverse members 26, rigidly attached to the frame beams 16. Rigidly mounted upon the drive shaft 25 are sprocket wheels 27, in alinement with the sprocket wheels 23, and located between the sides of the frame 19 and the sides of the frame 15, as more clearly shown in Figure 5. The transverse shaft 25 is equipped with sprocket wheels 28, rigidly secured thereto, engaging sprocket chains 29, extending upwardly and engaging sprocket wheels 30. These sprocket wheels are rigidly mounted upon stub shafts 31, Figures 1 and 5. These stub shafts are journaled in stationary bearings 32. Rigidly secured to the inner ends of the stub shafts 31 are toothed guide wheels 33, for a purpose to be described. The drive shaft 25 is provided at one end with a sprocket 34, rigidly secured thereto, and this sprocket may be engaged by a chain, driven by any suitable source of power.

The numeral 35 designates sprocket chains or endless belts, which travel upon the sprocket wheels 23 and 27. These sprocket chains carry lifting elements or trays 36, see more particularly Figures 5 and 9.

Each lifting element or tray embodies end trays 37. These end trays are rigidly connected by a transverse bar 38, rigidly secured thereto, by welding or the like. The end trays 37 are provided at their ends with inwardly projecting arms or brackets 39, as shown. Pins or bolts 40 are rigidly attached to the end trays 37 and pass through guide arms 41, which are retained vertical, and these pins are rigidly secured to the vertical guide arms 41. The sprocket chains 35 are arranged between the guide arms 41 and the end tray 37, and have openings formed in selected links thereof, for pivotally receiving the pins 40. The pins 40 project exteriorly of the guide arms 41 and carry short rollers 42. The numeral 43 designates upper guide rollers, pivotally mounted upon the upper ends of the guide arms 41, and projecting outwardly therefrom. The rollers 43 are longer than the rollers 42, for a purpose to be described. The endless chain 35 may carry any suitable number of lifting elements or trays, and may be conveniently spaced thereon, as is obvious.

Arranged between the vertical guide arms 41 and the sides of the frame 15 are vertically arranged tracks 44, which are identical. These tracks are rigidly secured to the inner faces of the sides of the frame 15. Each tracks embodies longitudinal passages 45, having walls 46. The passages 45 are connected by an upper curved passage 47. The upper portion of the inner walls 46 is cut away laterally, and an intermediate curved track wall 48 connects the portions of the inner wall 46. The longer roller 43 will remain within the passage 45 and travel through the curved passage 47, engaging between the inner and and outer walls 46, while the shorter roller 42 will be carried around by the sprocket wheel 27 and will clear the edge of the laterally reduced inner wall 46, and travel upon the intermediate curved track portion 48 and be conducted into the opposite longitudinal passage 45. In passing downwardly through the passage 45 the longer roller 46 engages with a laterally reduced deflecting rail 46' and is thereby guided into one of the downwardly converging passages 47, while the shorter roller 42 will clear the rail 46', and continue with the sprocket chain through the extension 48' of the passage 45. The outer wall 49 of this extension is straight while its inner wall 50 is curved, as shown. The roller 42 will travel around with the lower sprocket wheel 23 and hence enter the opposite passage 48', clearing the rail 46' and entering the other passage 45. The longer roller 43 traveling down one diverging passage 47 enters the vertical passage 51, in communication with these two passages, at their lower ends. The switch point 52 is located at the lower ends of the passages 47, and is normally retained in the position to the right, Figure 6, by a lever 53, with which it is connected, this lever being held in the lowered position by the weight 52'. The roller 43 travels first downwardly within the vertical passage 51 and then upwardly, the switch point 52 allowing of the downward movement. When the roller 42 travels upwardly, this switch point 52 serves to deflect the same into the converging passage 47 to the left.

Cooperating with the lower end of the vertical elevator is an inclined carrier 54, embodying inclined rails 55, mounted upon one side of the frame 15, and supported by standards 56. These rails carry sides 57.

The rails 55 are equipped with rollers or wheels 58, which are freely rotatable, to permit of the automatic gravitation of boxes or crates 59 thereon. Arranged in advance of the rollers 58, and spaced therefrom, are elevated inclined rail sections 60, disposed at an elevation above the rollers 58. These rail sections are supported by the rails 55 and carry rollers or wheels 61. Mounted upon the inner stationary frame 19, is a rearwardly projecting U-shaped rest element or track 62, rigidly attached to the frame 19. This U-shaped track is preferably horizontal and carries rollers or wheels 63. As clearly shown in Figure 2, the lowermost transverse shaft or rod 20 is arranged near and above the rest element or bracket 62, and serves as a stop for each box as it is automatically fed thereon. The sides of the rest bracket 61 and the elevated rails 60, are spaced inwardly from the tracks 44, sufficiently, so that they are cleared by the inwardly projecting fingers 39 of the lifting elements. As clearly shown in Figure 2, the ends of the rails 60 and rest element or bracket 62 are spaced, providing a passage 64, and the transverse connecting bar 38 travels through this passage, with the box resting directly over the passage, as shown.

Arranged near the upper sprocket wheel 27 and upon the opposite side of the machine is an inclined rest 65, including rails 66 carrying rotatable elements or wheels 67. An inclined package carrier 68 is arranged near and spaced from the rest element 65, and the transverse bar 38 of the lifting element passes between the same, as shown.

Simplified means are provided to feed the advance box or crate upon the elevated rail sections of the carrier and to positively prevent the succeeding boxes from passing thereon, until the first box has been carried upwardly a suitable distance by the elevator. This means embodies a reciprocating inclined carrier section, including rail sections 69, adapted to rest within recesses 70 formed in the rails 55. These rail sections, when in the lowered position, are flush with the upper edges 71 of the rails 55, while the elevated rail sections project above the same for substantial distances, affording stop shoulders 72. The rail sections 69 carrying rollers or wheels 73, rotatable thereon, the peripheries of which are flush with the peripheries of the rollers 58, when in the lowered position. When the rail sections 69 are shifted to the upper position, the peripheries of the rollers 73 become flush with the peripheries of the rollers 61, forming in effect an inclined carrier section therewith, the rear ends 74 of the rail sections 69 now projecting above the edges 71, constitute stop shoulders, to prevent the next box from gravitating upon the inclined reciprocating carrier section, as clearly shown in Figure 7. The next box therefore cannot pass to the vertical elevator, to be raised thereby until the box supported by the elevated rail sections and rest, has been carried upwardly a sufficient distance.

The rail sections 69 are rigidly mounted upon upstanding bars 75, which are inclined, and positively guided within guide-elements 76, which may be rigidly attached to the rails 55 by any suitable means. These bars 75 are connected at their upper and lower ends by transverse strips or bars 77 and 78.

The transverse bar 78 has a slotted pivotal connection with a vertically swinging trip lever 79, arranged beneath the inclined carrier and extending longitudinally thereof at its central longitudinal axis, and projecting through the bottom of the elevator frame. This lever 79 is pivoted at 80, to swing in a vertical plane, and its free end operates within a vertical guide 81. The lever 79 is provided outwardly of its pivot 80 with a curved or cam face 82, arranged in the path of travel of the transverse bar 38 of the lifting elements, as each lifting element approaches its lowermost position, the lever 79 is therefore depressed by the bar 39.

The operation of the apparatus is as follows:

With the parts arranged as more clearly shown in Figure 2, the forward box is supported upon the elevated rail sections 60 and associated elements. The next box is held against forward movement by engaging with the shoulder 72, and is supported upon the vertically reciprocating inclined carrier section. Upon the further travel of the sprocket chains 35, in the direction of the arrow, Figure 2, the next lifting element 36 will move into engagement with the bottom of the box and carry it upwardly. This lifting element is retained in the horizontal position, by virtue of the vertical arrangement of the guide arms 41, which are in turn maintained vertical. The upper longer rollers 43 remain within the passages 45 and travel into the curved passage 47, and are there engaged by the toothed guide wheels 33, positively locking therewith, and traveling around to the opposite side of the same. The shorter roller being arranged at the connection with the sprocket chain, is carried around, by the sprocket wheel 27, about the curved intermediate track section 48, and transmitted to the passage 45 at about the time that the long roller enters the upper end of this passage. As the lifting element approaches its lowermost position, the longer roller enters the converging passage 47, while the shorter roller travels through the passage 48' and about the lower sprocket wheel 23. The longer roller then travels upwardly through the passage 51, to the left, over switch point 52 and through the passage 47 to the left and again into the vertical passage 45, while the lower roller then enters the vertical passage 48'. This lifting element having passed the package carrier 68, has delivered the box upon the same, which is gravitated longitudinally thereof. As this lifting element approaches its lowermost position, its transverse bar 38 passes over the cam face 82, depressing the lever 79. This elevates the reciprocating carrier section, whereby the box supported thereon, Figure 2, will now gravitate upon the elevated rail section 60, Figure 7. The next box is held against downward movement by the elevated shoulder 74. The further travel of this elevating element releases the lever 79, and the reciprocating carrier section will drop, and the next box roll thereon, Figure 2, and be held against further forward movement, by engagement with the shoulder 72. This operation is repeated in connection with each elevating element.

The above described operation contemplates the discharge of the boxes from a lower level to an upper level, by the medium of the elevator. The operation may be reversed, in which event the weight 52' is connected to the opposite end of the lever 53, whereby the switch point 52 is normally held in the position to the left, Figure 6. The box or the like may then be passed from the carrier 68 down the elevator and delivered upon the elevated track section 60 and moved upon the reciprocating carrier section 69.

It is to be understood that the form of my invention herewith shown and described is to be taken as a preferred example of the same, and that various changes in the shape, size, and arrangement of parts may be resorted to, without departing from the spirit of my invention, or the scope of the subjoined claims.

Having thus described my invention, I claim:

1. In an apparatus of the character described, an upstanding elevator, and an inclined gravity carrier leading to the elevator, said carrier having lowered and elevated sections, and an inclined substantially vertically positively reciprocating section disposed between the first named sections, said reciprocating section being substantially flush with the lowered section when in the lower position with the elevated section projecting above the same, and means to raise and lower the reciprocating section.

2. In an apparatus of the character described, an upstanding elevator, and an inclined gravity carrier leading to the elevator, said carrier having lowered and elevated sections, and an inclined reciprocating section disposed between the first named sections, said reciprocating section being substantially flush with the lowered section when in the lower position and substantially flush with the elevated section when in the raised position, the rear end of the elevated section constituting a stop for the load on the reciprocating section when it is lowered and the rear end of the reciprocating section constituting a stop for the load on the lowered section when the reciprocating section is raised, and means to raise and lower the reciprocating section.

3. In an apparatus of the character described, an upstanding elevator, an inclined gravity carrier leading to the elevator, said carrier embodying sections disposed at different elevations, and a bodily substantially vertically positively reciprocating section mounted between the first named sections, and means to raise and lower the reciprocating section.

4. In an apparatus of the character described, an upstanding elevator, an inclined gravity carrier leading to the elevator, said carrier embodying sections disposed at different elevations, a bodily substantially vertically positively reciprocating section between the first named sections, and means automatically operated by a movable part of the elevator to raise and lower the reciprocating section.

5. In an apparatus of the character described, an upstanding elevator, an inclined elevated gravity carrier section leading to the elevator, a lowered inclined gravity carrier section terminating near the elevated section, a substantially vertically inclined reciprocating gravity carrier section arranged between the first named sections, positive means to guide the reciprocating section in its movement and to hold it against perceptible longitudinal movement upon its vertical movement, a trip lever connected with the reciprocating section and arranged in the path of travel of a part of the elevator, and discharge means receiving the load from the elevator.

6. In an apparatus of the character described, an upstanding elevator, a carrier leading to the elevator and embodying sections arranged at different elevations, a substantially vertically reciprocating section arranged between the first named sections to alternately move to the level of the same, positive means to guide the reciprocating section during its vertical movement and to hold the same against substantial longitudinal movement, and means to move the reciprocating sections.

7. In an apparatus of the character described, a carrier, and an upstanding elevator receiving the load from the carrier, said elevator comprising an upstanding frame, an endless conveyor mounted thereon and including a plurality of spaced lifting elements, upstanding guide arms secured to the lifting elements for controlling their lateral movement, rollers of different lengths secured to each guide arm near its upper and lower ends, track devices secured to the frame and arranged upon each side of the endless conveyor, each track device embodying a pair of deep longitudinal guide passages connected at their upper ends by a shallow transverse curved guide passage, deep extension guide passages leading into the lower ends of the longitudinal deep passages, downwardly converging deep passages leading into the lower ends of the longitudinal deep passages, an inner deep vertical passage connecting the ends of the converging passages, a pivoted switch point disposed at the juncture of the converging passages, weight means to hold this switch point in one position, shallow deflecting track sections interposed between the lower ends of the longitudinal deep passages and the longitudinal deep passage extensions, toothed guide wheels arranged in concentric relation to the curved shallow guide passages and adapted to engage with the long rollers and carry the same through the curved passage, means to drive the endless conveyor, and means to drive the toothed guide wheels.

8. An apparatus of the character described, an elevator comprising an upstanding frame, endless conveyor elements mounted upon the frame, lifting elements connected with the endless conveyor elements, upstanding guide arms connected with the lifting elements to prevent their tilting movement, long rollers carried by the upper ends of the guide arms, short rollers carried by the lower ends of the guide arms, tracks mounted upon the frame for coaction with the rollers of each guide arm, each track including longitudinal portions, an upper curved portion, downwardly diverging portions, an inner longitudinal portion leading into the downwardly diverging portions, a pivoted switch point at the lower ends of the diverging portions, and deflecting rail sections at the juncture of the longitudinal portions and diverging portions, and guide wheels disposed near and concentrically with respect to the curved track portions and adapted to positively engage with the long rollers.

9. An apparatus of the character described, comprising an upstanding frame, an endless conveyor mounted thereon embodying a plurality of spaced lifting elements, each lifting element having a trip member, an inclined gravity carrier leading to the elevator, embodying sections disposed at different elevations, a positive reciprocating section arranged between the first named sections, and a single trip lever extending longitudinally of the carrier and pivoted to swing in a vertical plane and connected with the carrier and having its rear end projecting under the endless conveyor, such rear end being arranged in the path of travel of the trip members.

10. An apparatus of the character described, comprising an upstanding frame, an endless conveyor mounted thereon embodying a plurality of spaced lifting elements, each lifting element having a trip member, a carrier arranged upon one side of the frame and embodying sections disposed in different elevations, a positively reciprocating section arranged between the first named sections, a single trip lever extending longitudinally of the carrier and having its forward end projecting through the frame beneath the endless conveyor and having a cam face disposed in the path of travel of the trip members, means to pivotally support the trip lever, and means to connect the rear end of the trip lever with the reciprocating section.

In testimony whereof I affix my signature.

CLARENCE P. LEE.